April 2, 1968 A. BLUMER 3,375,554
INJECTION MOULD FOR PLASTIC INJECTION MOULDING MACHINES
FOR THE PRODUCTION OF AXIALLY
SYMMETRICAL HOLLOW BODIES
Filed May 5, 1965 2 Sheets-Sheet 2

INVENTOR:
ARMIN BLUMER
by: Harry Ernest Rubens
Attorney 3,375,554
INJECTION MOULD FOR PLASTIC INJECTION MOULDING MACHINES FOR THE PRODUCTION OF AXIALLY SYMMETRICAL HOLLOW BODIES
Armin Blumer, 8762 Schwanden, Switzerland
Filed May 5, 1965, Ser. No. 453,249
Claims priority, application Switzerland, May 11, 1964, 6,174/64; Feb. 5, 1965, 1,632/65
3 Claims. (Cl. 18—42)

ABSTRACT OF THE DISCLOSURE

An injection mold for making axially symmetrical hollow bodies, such as plastic cups, which consists of an outer mould part and an inner mould core, with the outer mould part having a protuberance projecting into the inner mould core having an axial injection aperture to form an axial depression in the mould core, the protuberance projecting into the mould core substantially beyond the lowermost peripheral portions of the mould core to form an automatic self centering relationship between the axis of the mould core and the axis of the outer mould part.

---

Figure 1:
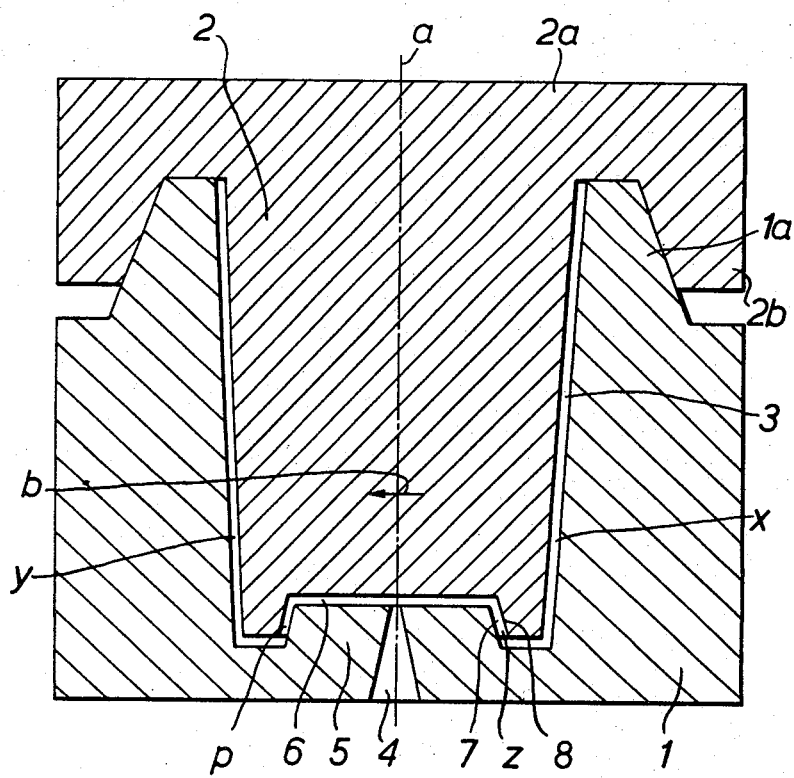

This invention relates to an injection mould for plastic injection moulding machines for the production of axially symmetrical hollow bodies, for example tumblers or containers. These injection moulds are usually in two parts, that is to say they consist of an outer mould and a mould core. Plastic tumblers or containers have only a slight wall thickness, which means that the working surfaces of the outer mould and the mould core, which are only a short distance from one another must be accurately worked and that in addition the core must be held centred with the greatest possible accuracy in relation to the outer mould during the injection operation, since otherwise there will be undesirable differences in wall thickness in the moulded product. It is known to fasten the mould core on the opening side of the outer mould while the plasticised plastic material is injected through an axial opening in the bottom of the outer mould into the mould cavity left between the peripheral and bottom surfaces of the two parts of the mould. It is immediately clear that the mould core consequently projects completely freely and without support into the outer mould. During the injection operation it is practically impossible to achieve absolutely uniform distribution of the moulding material around the axis of the mould; it must always be expected that the moulding material will penetrate rather more quickly into the mould cavity at one point of the periphery and there produce a certain elevated pressure which will tend to displace the mould core transversely of the axis of the mould. Although the mould plate carrying the core is rigidly fastened, this has the consequence, particularly in the case of mould cores having relatively great axial length such as are required for the production of narrow, deep tumblers, that the core is bent out to one side, so that there is necessarily a corresponding local variation of the wall thickness of the moulded tumbler. Since the mould core is bent out of its axis, the mould cavity is widened at the point where elevated pressure has occurred, thus giving rise to still more intensive flowing of moulding material into this part of the mould cavity, so that it is practically no longer possible for the mould core to spring back into its central position.

The object of the invention is to provide an injection mould which automatically centres itself perfectly during the injection operation, so that the abovedescribed disadvantages are avoided. To this end the injection mould according to the invention is characterised in that an axial protuberance on the bottom of the outer mould projects into an axial depression in the bottom of the mould core while maintaining a distance therefrom which corresponds to the wall thickness of the moulded product to be produced. This formation of the two parts of the mould has the consequence that when elevated moulding material pressure occurs at one point in the peripheral cavity between the outer mould and the mould core, which then results in the bending out of the core towards the diametrally opposite side to the point at which elevated pressure has occured, the lateral distance between the bottom protuberance on the outer mould which projects into the bottom of the mould core is correspondingly reduced; the flow of material to the point of elevated pressure is thus necessarily throttled, thus bringing about a lowering of the pressure and hence a corresponding relieving of the core, which consequently can recentre itself.

Figure 2:
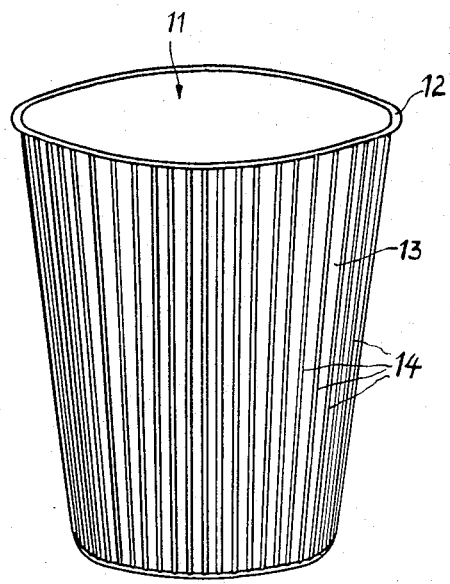

One example of construction of the injection mould according to the invention is illustrated in a vertical section in FIGURE 1 of the accompanying drawings, while FIGURE 2 shows in perspective a ribbed tumbler produced with the aid of this mould. In FIGURE 1, 1 designates the outer mould and 2 the mould core. When the mould is closed, the mould core 2 projects into the outer mould 1, leaving the gap corresponding to the wall thickness of the plastic tumbler to be produced and forming the mould cavity 3. At the end projecting out of the outer mould 1 the core 2 has an end plate 2a having an annular flange 2b projecting towards the core. This annular flange 2b has a conical inner surface which is coaxial to the mould axis $a$ and which when the mould is closed rests on a corresponding conical outer surface on a neck 1a on the outer mould. When the mould is closed and unfilled, the core 2 is consequently perfectly centred.

In the bottom of the outer mould 1 there is provided an axial injection opening 4 which leads into the mould cavity 3. In addition, the bottom of the outer mould 1 has a trucated conical axial projection 5 which, while maintaining a distance corresponding to the wall thickness of the tumbler to be produced, projects into an axial depression 6 in the bottom of the mould core 2. The projection 5 and depression 6 could also have a cylindrical or spherical curvature instead of a truncated conical shape. Through this interengagement of core and outer mould in the region of the bottom of the mould the effect is achieved that a part 7 of the peripheral surface of the outer mould, which bounds the mould cavity 3 on the outside, will there lie radially inside the oppositely situated part 8 of the peripheral surface of the mould core which bounds the mould cavity 3 on the inside.

When plasticised plastic material is injected through the injection aperture 4, said plastic material is in theory distributed completely uniformly over the entire periphery of the mould cavity; in practice however, it is hardly possible to prevent the moulding material from penetrating rather more quickly, for some reason, into some point on the periphery. It will be assumed that the moulding material reaches the point $x$ in the mould cavity 3 rather more quickly than the diametrally opposite point $y$. This has the consequence that the pressure at point $x$ is temporarily higher than the pressure at the point $y$, so that the core 2, which has a relatively great axial length and projects freely and without support into the outer mould, is bent out transversely of the axis $a$ of the mould, in the direction of the arrow $b$. The distance between the mould surface parts 7, 8 at the point $z$ lying in the same axial plane as the point $x$ is thereby necessarily reduced in accordance with the deflection of the core 2. This reduction of the gap at point z, which is equivalent to a reduction of the passage cross-section, results in a throttling of the flow of moulding material to point x, while at the same time through the corresponding increase in the distance between the surface parts 7, 8 at the point p lying diametrally opposite the point z there is an increase of the flow of moulding material to point y. This throttling of the flow of moulding material on the one hand and the increase of said flow on the other hand bring the pressure conditions at points x and y back into equilibrium immediately, the core 2 is straightened, and during the injection operaiton the flow of moulding material can once again take place uniformly over the entire periphery of the mould cavity.

In consequence of the above described construction of the injection mould, perfect centring is achieved even of relatively long, narrow cores, and thus a constant wall thickness, over the entire periphery, of the plastic tumbler produced. It is thus also possible to produce tumblers the very thin walls of which are provided on the outside with fine longitudinal ribs forming a kind of fluting. A tumbler of this type is illustrated in FIGURE 2.

The tumblers hitherto used in automatic machines dispensing hot beverages, such as milk, coffee, and the like, generally consist of paper or a thermoplastic material; the surface of these known tumblers is smooth on the inside and on the outside. These tumblers are therefore rather difficult to grip and must be held with relatively great pressure when filled. This gives rise to various disadvantages. The smooth, thin tumbler walls have only slight resistance to denting; even relatively light finger pressure leads to deformations or denting, which may easily give rise to the overflowing of the contents of the tumbler or even to the slipping of the latter out of the hand. Particularly when these tumblers are used in, automatic machines for dispensing hot beverages (in which the temperature is usually about 70° C.), the thin, smooth tumbler walls tend to burn the fingers, because on the one hand the wall thickness is very slight and therefore the conduction of heat is very good, and on the other hand because the smoothness of the outer surface of the tumbler provides a relatively large surface of contact. A general thickening of the wall thickness of the tumblers would certainly improve their stiffness and therefore reduce the risk of denting, but on the one hand in consequence of the heavy consumption of material these tumblers would then become too expensive and on the other hand the heating of the smooth outside of the tumbler would only be slightly retarded, while the large surface of contact when the tumbler is gripped would not in any way be reduced.

The tumbler according to the invention eliminates these disadvantages; the tumbler according to the invention has at least over the greater part of its height a ribbed outer surface, the external ribs advantageously extending along generatrices of the tumbler and over its entire height.

The effect is thereby achieved that the outer surface of the tumbler is considerably easier to grip than in the case of known tumblers having walls smooth both on the inside and on the outside. In addition, the external ribs result in a stiffening of the tumbler wall and therefore is an increase in resistance to denting. The greater wall thickness at the ribs slows down the transmission of heat through the wall to the outer gripping surface, and above all this gripping surface is restricted to the outer surface of the ribs and therefore very considerably reduced in size in comparison with a tumbler having smooth walls, while the heat transfer surface, that is to say the entire outer surface of the tumbler, is necessarily considerably greater than the smooth, inner heat receiving surface, thus leading to lower outside temperatures than in the case of tumblers which are smooth on the inside and on the outside.

From the aesthetic point of view the ribbed tumbler is also more attractive in appearance than the known plain tumbler having smooth outside walls, particularly when it is made of a translucent plastic which in itself is not very attractive.

One example of a tumbler according to the invention is illustrated in perspective in the accompanying drawing.

In FIGURE 2, 11 designates a tumbler such as can for example be used in automatic machines for dispensing hot beverages and which was produced by injection moulding of thermoplastic material with a mould of the type illustrated in FIGURE 1. While the bottom of the tumbler, which is not visible in the drawing and which is provided with a raised portion in accordance with the mould protuberance 5, is smooth on the inside and outside, the peripheral wall 13 of the tumbler which is provided with an upper annular flange 12, is smooth only on the inside while on the outside it is provided with ribs 14. The ribs 14, extending along generatrices of the tumbler wall 13, are relatively narrow in the peripheral direction of the tumbler, that is to say the width of the ribs is smaller than the width of the smooth wall strips lying between neighbouring ribs; the distance between ribs in the peripheral direction is preferably about 2 to 5 mm. The effect is thereby obtained that on the one hand when the tumbler is gripped even with relatively heavy finger pressure, the hand of the user will reliably come to lie only on the relatively narrow ribs without touching the parts of the tumbler lying therebetween, while on the other hand a number of ribs will always be gripped so that a sufficiently easily gripped surface is provided. In the example illustrated the ribs 14 have a spherical cross-section; they could however also have a trapezoidal or triangular cross-section. The height of the ribs is advantageously approximately equal to the wall thickness of the tumbler wall where there are no ribs, so that in the region of the ribs the wall thickness of the tumbler is approximately doubled.

Provided that the manufacturing process permits, the longitudinal ribs could be replaced by ribs extending at an angle or in the peripheral direction. In addition it is possible for the ribs not to extend over the entire height of the tumbler, as illustrated, but only over part of the height for example, in which case however care should be taken to ensure that the ribs extend over the entire part of the tumbler which comes into contact with the hand when gripped.

The extra consumption of material in the tumbler described is very small in comparison with a conventional smooth-walled tumbler, and manufacture presents no difficulty; on the other hand the ribs not only enable a substantial stiffening of the tumbler to be achieved and enable it to be gripped more easily, but also provide considerable insulating effect which makes it practically impossible for the fingers to be burned when a tumbler filled with a hot beverage is gripped.

I claim:

1. An injection mould for plastic injection moulding machines for the manufacture of axially symmetrical hollow bodies, said mould comprising an outer mould part having an axial injection aperture in the bottom and a mould core projecting into said outer part, characterised in that an axial protuberance on the bottom of the outer mould projects into an axial depression on the bottom of the mould core substantially beyond the lowermost peripheral portions of the mould core to form an automatic self centering relationship between the axis of the outer mould part while maintaining a distance therefrom corresponding to the wall thickness of the moulded product to be produced.

2. An injection mould according to claim 1, characterised in that the axial bottom protuberance in the outer mould and the corresponding depression in the bottom of the mould core have a truncated conical, cylindrical, or spherical curvature.

3. An injection mould according to claim 2, characterised in that the mould core has an end plate having an annular flange which projects axially towards the core side and which when the mould is closed rests by a conical inner surface on a corresponding conical outer surface of a neck part of the outer mould.

References Cited

UNITED STATES PATENTS

| | | | |
|---|---|---|---|
| 2,578,719 | 12/1951 | Mayer et al. | 18—42 |
| 2,890,488 | 6/1959 | Gemberling | 18—42 |
| 2,981,976 | 5/1961 | Maier | 18—42 |
| 3,093,865 | 6/1963 | Peters et al. | 18—42 |
| 3,169,688 | 2/1965 | Schad | 229—1.5 |
| 3,169,689 | 2/1965 | Schwartz | 229—1.5 |
| 3,194,468 | 7/1965 | Baron | 229—1.5 |

JOSEPH R. LECLAIR, *Primary Examiner.*

R. PESHOCK, *Assistant Examiner.*